Patented Dec. 2, 1947

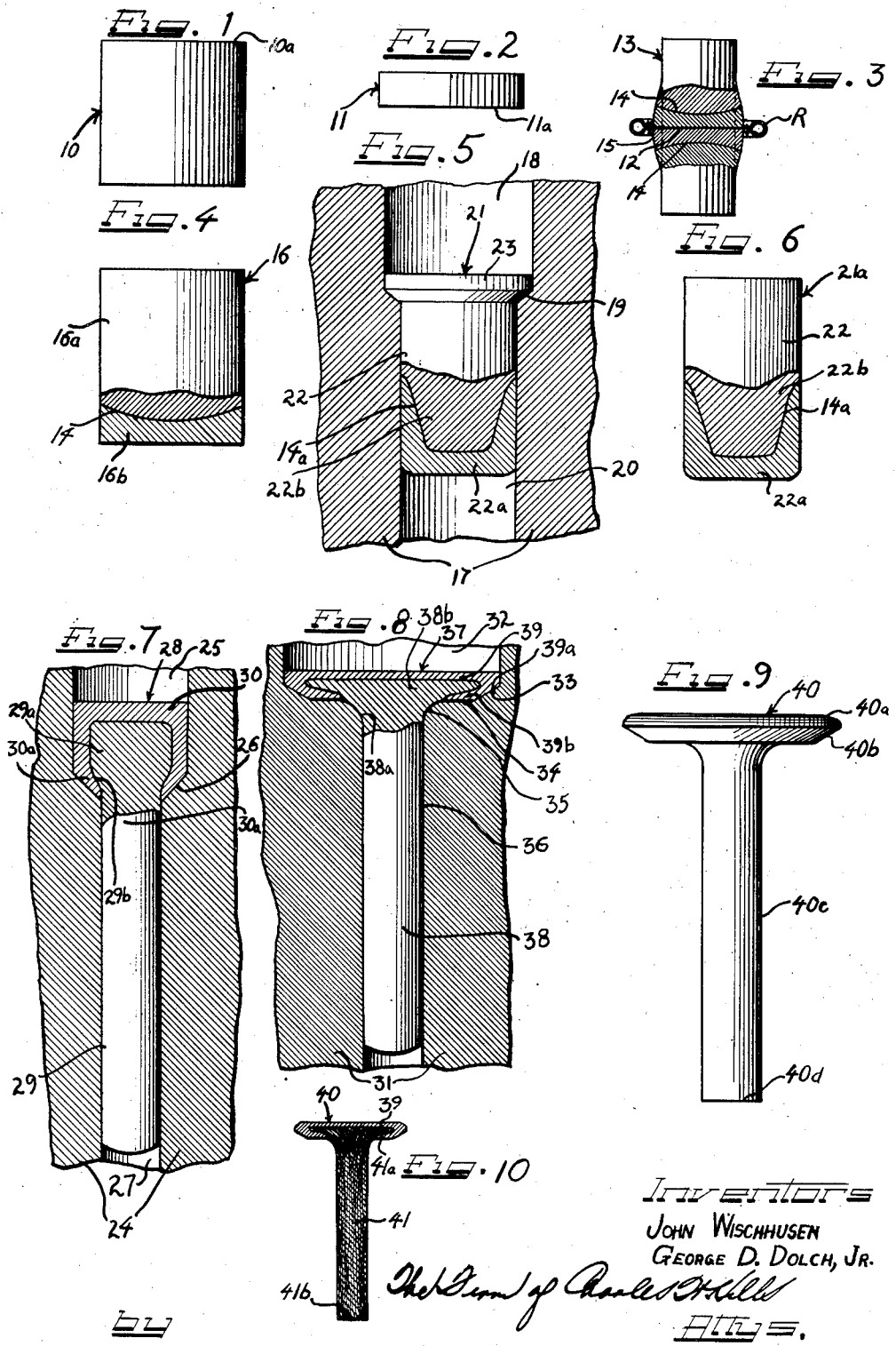

2,431,853

UNITED STATES PATENT OFFICE 2,431,853

METHOD OF MAKING COMPOSITE POPPET VALVES

John Wischhusen, Euclid, and George D. Dolch, Jr., Cleveland, Ohio, assignors to Thompson Products, Inc., Cleveland, Ohio, a corporation of Ohio Application December 29, 1945, Serial No. 638,000

5 Claims. (Cl. 29—156.7)

This invention relates to the production of poppet valves for internal combustion engines and the like wherein the valve head is covered with a corrosion-resistant sheath in intimate bonded relation to the head.

Specifically this invention deals with the extrusion and coining of a bi-metal slug composed of a main body portion formed from tough, stress-resistant steel alloy and a covering disk composed of corrosion-resistant alloys or the like joined along a bowed weld line that is easily deformed to direct the corrosion-resistant alloy metal around and under the periphery of the valve head.

In accordance with this invention, a solid cylindrical metal billet composed of forgeable stress-resistant metal such as austenitic steel has one end face thereof covered with a disk of corrosion-resistant metal. The disk and billet are integrally united by pressure welding in such a manner that the weld line will have an arcuate contour with the billet metal extending into the center of the disk and with the disk metal being thicker around its peripheral portion than at its central portion. The resulting bi-metal slug is then extruded through a die which reduces the diameter of the slug. The disk end of the slug enters the die first and the extruding operation draws the periphery of the disk back around the sides of the billet metal to produce a blank with an end portion covered by the disk metal both across the end of the blank and along the side of the blank adjacent this end. The billet end of the thus-formed blank is then extruded to reduce the billet metal to valve stem diameter, thereby elongating the metal and forming the valve stem. This second extrusion is terminated before the disk metal passes completely through the extruding die, so as to leave a head on the elongated stem which head is covered by the disk metal. The head is next coined in a coining die to flatten it into valve head shape. The resulting valve head is completely sheathed or clad with the disk metal and this disk metal extends around the periphery of the head and under the head to provide a seating face for the valve. Since the grain bands of the billet metal run lengthwise of the billet, all ends of the grain bands are covered by the sheath at the head end of the valve. The longitudinally extending grain bands of the billet metal define the exposed stem surface with their sides only, and the resulting valve is, therefore, much more resistant to pitting or corrosion since corroding action is facilitated when the grain bands of the metal have their ends exposed to the corroding atmosphere.

It is, then, an object of this invention to prepare poppet valves having the heads thereof covered with corrosion-resistant metal caps that are formed simultaneously with the formation of the valve and are integrally bonded to the valve body.

A still further object of the invention is to provide a bi-metal poppet valve by pressure welding, extruding, and coining operations.

A still further object of the invention is to pressure-weld a corrosion-resistant disk to a stress-resistant billet by pressure welding in such a manner as to form a bowed weld line between the disk and billet which is then readily deformed by extruding operations for forming a valve head completely encased in disk metal.

Another object of the invention is to form a poppet valve from bi-metal slugs having a bowed weld line between the bi-metal parts of the slug that is so shaped as to insure the drawing of one metal around the other metal in an extruding operation.

Another object of the invention is to prepare a poppet valve for internal combustion engines or the like composed of a body metal having the metal grain bands extending axially therethrough with the ends thereof covered at the head of the valve by a sheath of corrosion-resistant metal integrally bonded to the body metal so that all grain band ends in the vicinity of the head of the valve are covered.

Other and further objects of the invention will be apparent to those skilled in the art from the following detailed description of the annexed sheet of drawings which, by way of a preferred example only, illustrates one embodiment of the invention.

On the drawings:

Figure 1 is a side elevational view of a solid cylindrical metal billet to form the body portion of the valve of this invention.

Figure 2 is a side elevational view of a corrosion-resistant metal disk to form the sheath or covering for the head of the valve of this invention.

Figure 3 is a side elevational view illustrating the manner in which billets and disks of Figures 1 and 2 are stacked and pressure-welded to produce an arcuate or bowed weld line between the disk and billet.

Figure 4 is a side elevational view, with parts broken away and shown in vertical cross section, of a bi-metal slug formed by pressure-welding and machining from the billet and disk of Figures 1 and 2.

Figure 5 is a vertical cross-sectional view, with parts in side elevation, of an extrusion die illustrating the manner in which the slug of Figure 4 is extruded to produce a blank for forming poppet valves according to this invention.

Figure 6 is a side elevational view, with parts broken away and shown in vertical cross section, of a blank machined from the blank shown in Figure 5.

Figure 7 is a vertical cross-sectional view, with parts in elevation, of an extrusion die with a valve blank formed therein from the blank of Figure 6.

Figure 8 is a vertical cross-sectional view, with parts in elevation, of a coining die with a poppet valve formed therein from the blank shown in Figure 7.

Figure 9 is a side elevational view of a finished poppet valve according to this invention.

Figure 10 is an axial cross-sectional view of a poppet valve formed according to this invention illustrating the grain bands in the body of the valve.

As shown on the drawings:

In Figure 1, the reference numeral 10 designates a cylindrical solid metal billet composed of forgeable stress-resistant metal such as austenitic steel. This metal is preferably resistant to heat and corrosion, and is therefore generally composed of a nickel-chromium alloy austenitic steel including a steel having the following formula:

|  | Per cent |
|---|---|
| Nickel | 14 |
| Chromium | 14 |
| Tungsten | 2.40 |
| Carbon | 0.45 |
| Molybdenum | 0.35 |

Remainder substantially all iron.

The billet 10 is provided with a clean, smooth, flat, end face 10a.

A solid cylindrical slab or disk 11, which is much thinner than the billet 10 but which has about the same diameter as the billet 10, has a clean, flat, smooth end face 11a, provided thereon, as shown in Figure 2. This disk 11 is composed of corrosion-resistant metal, examples of which are: nickel, chromium, and iron alloys; nickel, molybdenum, and iron alloys; non-ferrous nickel-chromium alloys; chromium-tungsten alloys; and the like.

The disk 11 is mounted on the billet 10 with the face 11a thereof in full seating engagement on the face 10a of the billet. As shown in Figure 3, a separator sheet 12 composed of mica, or other heat-resistant material, is then placed on top of the disk 11. Another disk 11 is placed on top of this separator sheet 12, and another billet 10 is placed on top of the second disk. The resulting stack 13, shown in Figure 3, is then subjected to a pressure-welding operation. For this operation, pressures from about 4,000 to 6,000 lbs. per square inch of contacting surface 10a and 11a are used. When a metal billet 10 of about three inches in diameter and about one and one-quarter inch high is used with a disk of the same diameter but about seven-eighths of an inch high, pressures of about 5,700 lbs. per square inch of contacting surface are used. These pressures completely eliminate any gases or air from between the contacting surfaces and the surfaces are actually wrung together in intimate full contact.

An oxyacetylene torch head (not shown) including a ring "R" surrounding the stack shown in Figure 3 projects jets of flame at about 5500° F. against the metal of the stack. The torch head is reciprocated and oscillated so that the flame jets will not continually impinge upon the same spot of the assembly, but will heat the assembly adjacent each side of the contacting surfaces between the billet and disk. Instead of using an oxyacetylene torch ring, the heating may be accomplished by electrical induction through the use of suitable inductors (not shown). After about eleven minutes of exposure to a 5500° F. heat, the three inch diameter disks and billets are usually heated to welding temperatures below the melting points of the metals. Welding temperatures of around 2300° F. are reached. Since the disk metal is less plastic at the welding temperature than the billet metal, it is not softened as much as the billet metal, and the softer billet metal is depressed around the periphery of the weld line to form bowed or arcuate weld lines 14. An outwardly bowed head 15 is also formed by metal displaced outwardly from the billet and disk.

The bead 15 is ground or machined off of the welded part to form a bi-metal slug shown at 16 in Figure 4. The bi-metal slug 16 has a main body portion 16a composed of the metal of the billet 10 and an end cover 16b composed of the disk metal 11. The weld line 14 between the portions 16a and 16b is bowed with the disk metal being thicker around the periphery of the blank than in the central portion of the blank. As will be hereinafter more fully explained, this arcuate weld line 14 facilitates drawing of the disk metal around the sides of the billet metal.

The slug of Figure 4 is subjected to an extruding operation in a die 17 shown in Figure 5. The die has an inlet passageway 18 of a diameter accommodating the slug 16. An extrusion throat or beveled seat 19 is provided at the bottom of the passageway 18 and extends inwardly to a reduced-diameter passageway 20. The slug 16 is heated to forging temperatures, dropped in the passageway 18 of the die 17, and forced through the extrusion throat 19 with the disk portion 16b of the slug forming the leading end of the extruding blank. As shown in Figure 5, the slug 16 is extruded for most of its length to form a headed blank 21 having a main shank portion 22 reduced to the diameter of the passage 20 and a head portion 23 of the same diameter as the original slug 16. The disk metal portion 22a of the shank 22 is drawn around the sides of the billet metal portion 22b and the weld line 14 is thus materially deformed to have a cup-shaped configuration illustrated at 14a. The extruding operation therefore not only reduces the diameter of the slug 16 to form the shank 22, but also simultaneously draws the disk metal around the leading end of the billet metal so that the disk metal will extend over the sides of the leading end of the billet metal. This drawing operation is facilitated by the initial bow of the weld line 14 since the peripheral portions of the weld line are initially disposed at a higher level than the central portion thereof and the extrusion operation moves the peripheral portions of the weld line to a still higher level. Thus there is definite cooperation between the initial shape of the weld line 14 and the extruded shape 14a of the weld line with the initial shape guiding and controlling formation of the desired shape. The simultaneous extrusion for reduction of diameter and drawing for covering the side faces adjacent the leading end of the billet with disk metal is accomplished without complications and is enhanced by the softer qualities of the billet metal.

After the extrusion operation, the headed blank 21 is removed from the die 17. The head 23 of the blank 21 is then ground or machined off to provide a cylindrical blank 21a shown in Figure 6.

Alternatively, the slug 16 of Figure 4 can be topped with a metal chaser disk so that the entire slug can be forced through the extrusion throat 19 with the chaser forming the headed portion for the resulting blank. The chaser is then cut from the blank to produce a blank such as 21a.

As shown in Figure 7, a second extrusion die 24 is provided to define a cylindrical inlet passageway 25 accommodating the blank 21a. An extrusion throat or beveled seat 26 is provided at the bottom of the passageway 25 and converges to a cylindrical stem-defining passageway 27. The blank 21a, at forging temperatures, is inserted in the passageway 25 of the die 24 with the billet metal portion 22b thereof forming the leading end of the blank. In other words, the blank 21a is turned upside down from the position shown in Figure 6 and is inserted into the passageway 25 with the billet metal portion 22b thereof resting on the extrusion throat 26. An extruding punch is then forced into the passageway 25 on top of the disk portion 22a of the blank to force the leading end of the blank through the extrusion throat and form a reduced-diameter rod-like valve stem. The extruding operation is terminated when the side walls of the disk portion 22a of the blank 21a reach the discharge end of the extrusion throat 26. A blank 28 is thereby produced. This blank 28 has a valve stem portion 29 composed entirely of the billet metal from the portion 22b of the blank 21a. The portion of the billet metal which extends into the disk metal is stopped before this portion passes through the extrusion throat. A head 29a is thereby provided on the stem 29. The blank 28 also has a head 30 surrounding the head 29a. This head 30 is composed of the disk metal 22a from the blank 21a and is partially extruded at the leading ends of its sides as at 30a to extend under the head 29a. Thus, the leading ends of the sides of the drawn disk portion 22a of the blank 21a are extruded inwardly to the contour of the extrusion seat or throat 26 and, since the disk metal is harder than the billet metal, these inwardly deformed leading ends 30a will bite into the softer billet metal to form a neck portion 29b on the billet metal joining the head 29a with the stem 29. This neck portion is completely covered by the portion 30a of the disk metal. The blank 28 therefore has a stem or shank with an enlarged head on the end thereof completely encased in and clad by a sheath 30 composed of the disk metal. The extrusion operation is terminated before the disk metal is forced into the passageway 27 but after the extrusion throat or seat 26 has shaped the leading ends of the side walls of the disk metal.

After the extrusion operation in the die 24, the blank 28 is removed from the die and is next inserted in the shaping cavity of a coining die 31 shown in Figure 8. The die 31 has a cylindrical cavity 32 of the same diameter as is desired for the poppet valve head. A beveled seat 33 converges inwardly from the bottom of the cavity 32 to a flat wall 34. The flat wall extends horizontally inwardly to a rounded neck-defining mouth 35 which converges to a reduced-diameter cylindrical stem-receiving cavity 36.

The blank 28 is inserted into the die 31 with the stem 29 thereof extending into the cavity 36 and with the head 30 thereof projecting freely into the cavity 32. A coining punch snugly fitting the cavity 32 then acts on the top of the head of the blank to flatten it and expand it radially to form the poppet valve head. A blank 37 is thereby produced with a stem 38 formed from the billet metal of the original billet 10. This stem 38 is cylindrical for the major portion of its length but flares outwardly at 38a over the neck 35 of the die to provide the poppet valve neck. The neck 38a extends radially into a head portion 38b completely encased in and clad by a covering 39 composed of disk metal from the original disk 11. This covering 39 extends completely over the top of the head 38b and radially therebeyond to the diameter of the cavity 32. It is formed by the seat 33 to have a beveled face 39a converging inwardly from its radial extremity to a level under the head and then extending radially inward as at 39b to the neck 38a for underlapping a considerable area of the head 38b. Thus the portion 30a of the blank 28 is flattened with the adjacent portion 29b of the blank head 29a to completely underlap this portion 29b of the head.

In the blank 37, the covering 39 is thus not only integrally bonded to the head 38b but it is also clinched onto the head 38b and will never be separated from the head 38b in operation of the valve.

The coined blank 37 is removed from the die 31 and machined to form the finished poppet valve 40 shown in Figure 9. Only minor machining operations are necessary, such as, for example, to provide a beveled surface 40a around the top of the valve head, to provide a polished seating face 40b, to polish and machine the stem 40c to finished dimensions, and to provide a flat bottom 40d on the tip end of the stem. The valve 40 thus has the stem and neck portions thereof composed of the stress-resisting metal from the billet 10, and this metal extends into the head. The head is completely covered and clad with the corrosion-resistant metal from the disk 11 but is backed up and fortified to better resist shock loads by the stress-resisting metal therein. The corrosion-resistant metal not only covers the top of the billet metal, but also surrounds the head portion of the billet metal to protect it from corrosive gases and the like encountered in an internal combustion engine by the head of an operating poppet valve. The seating face 40b for the valve is composed entirely of the corrosion-resistant metal.

As shown in Figure 10, if the billet metal, as is customary, is cut from an elongated rod, it will have the grain bands thereof extending lengthwise or axially therethrough and the finished valve 40 of this invention therefore has metal grain bands 41 extending lengthwise of the stem and covered head portion thereof with these grain bands being bowed outwardly as at 41a in the head portion of the billet metal. The ends of the grain bands in the head portion of the billet metal are completely covered and encased in the cap or sheath 39 composed of the disk metal from the disk 11. The only exposed grain band ends are at 41b in the very tip end of the stem, but these exposed grain band ends are never subjected to the corrosive action of gases in the combustion chamber and exhaust port of an internal combustion engine. All surfaces of the billet metal exposed to such corrosive action are defined entirely by the sides of the grain bands and, as a result, the portion of the valve which is composed of metal selected primarily for stress-resisting properties is rendered more corrosion resistant because corrosive action and pitting are always enhanced on surfaces defined by the ends of the metal grain bands.

In addition, since the forging operation only involves bowing of grain bands to form the head 38b of the billet metal, a tougher fibrous metal construction results such as cannot be produced by lathe-turning or machining operations which cut across the grain of the metal.

From the above descriptions it will be clear that this invention provides an economical method of making bi-metal poppet valves having enhanced stress-resistance and corrosion resistance properties. In the method of this invention, a bi-metal slug is extruded and coined to form a valve with the stem portion thereof composed of the stress-resisting metal of the slug and extending into the head portion of the valve, but with the head portion being completely surrounded with a covering of the corrosion-resisting metal of the slug to form the seating face for the valve as well as a protecting sheath for the stress-resisting metal.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. The method of making composite poppet valves which comprises covering a flat end of stress-resisting metal billets with slabs of corrosion-resistant metal having flat faces mating with the flat faces of the billets, placing a heat-resistant separator on top of one slab on a billet, placing the slab on another billet on top of the heat-resistant separator, subjecting the resulting stack to pressures of from 4000 to 6000 lbs. per square inch of contacting surfaces between the slabs and billets, impinging oxyacetylene flame jets at temperatures of about 5500° F. around the resulting stack in the vicinity of the contacting surfaces between the billets and slabs to heat the metals to welding temperatures of around 2300° F., continuing the heat and pressure treatment for about eleven minutes until the stack bulges outwardly in the vicinity of the slabs and decreases in height to thereby weld the slabs to the billets along a bowed weld line between the slabs and billets with the slab metal being thicker around its peripheral portion than at its central portion, removing the bulged portion from the resulting bi-metal slugs, extruding a slug in a cylindrical extruding die for reducing the diameter of the slug and with the slab metal forming the leading end of the extruding metal, simultaneously drawing the slab metal around the sides of the billet metal during the extruding operation, extruding the resulting blank in a second extrusion die with the billet metal forming the leading end of the extruding metal to form a blank with an elongated stem portion and a head portion clad with the slab metal, and coining the head portion of the elongated blank into poppet valve shape to produce a poppet valve head composed of both billet metal and slab metal with the slab metal completely covering and underlapping the head portion of the billet metal.

2. The method of making composite poppet valves which comprises pressure-welding a corrosion-resistant metal slab to the end face of a stress-resistant metal billet for forming a bi-metal slug having a bowed weld line between the metals thereof with the slab metal being thicker around the periphery thereof than at the central portion thereof, forcing the slug through an extrusion throat with the slab metal forming the leading end of the slug to simultaneously reduce the diameter of the slug and draw the slab metal around the sides of the billet metal, extruding the resulting blank through an extrusion throat with the billet metal forming the leading end of the blank, terminating said extruding operation before the slab metal passes through the extrusion throat to form an elongated headed blank with the head portion thereof surrounded by the slab metal, and coining the elongated headed blank to flatten the head portion thereof into poppet valve shape for producing a poppet valve having a composite head of stress-resisting metal completely encased in and surrounded by corrosion-resistant metal.

3. The method of making a composite poppet valve comprising a headed main body portion composed of stress-resistant steel and a corrosion-resistant metal sheath integrally bonded to and completely surrounding the head portion of the body which comprises forming a bi-metal slug with a main body portion having an end covered with a corrosion-resistant metal slab and integrally bonded thereto along a bowed weld line having its apex in the axial central portion of the slug, extruding the slug through a cylindrical extrusion throat with the corrosion-resistant metal forming the leading end of the slug, simultaneously drawing the corrosion-resistant metal around the sides of the billet metal to form a blank having an end covered by a cup-shaped corrosion-resistant metal piece in integral bonded relation thereon, extruding the blank through a second cylindrical extrusion throat with the billet metal portion of the blank forming the leading end of the blank to reduce the billet portion to valve stem diameter, terminating the extruding operation as the sides of the corrosion-resistant metal enter the extrusion throat to underlap the non-extruded portion of the billet metal with corrosion resistant metal, and coining the composite head portion of the resulting elongated blank to flatten the head portion into poppet valve shape and produce a composite valve head composed of billet metal and corrosion-resistant metal with the corrosion-resistant metal completely surrounding and underlapping the head portion of the billet metal for defining the valve seat face.

4. The method of making a composite headed article from a bi-metal slug composed of a metal body with an end cover of different metal bonded thereto which comprises simultaneously extruding and drawing said slug progressively from the end cover end thereof to reduce the diameter of both metals thereof and to draw the cover metal around the body metal, extruding the body metal of the resulting extruded blank to form an elongated reduced diameter shank therefrom, terminating the extruding operation before the cover metal of the blank is extruded to leave a head end on the elongated shank composed of both metals, and coining the head to desired contour.

5. The method of making a poppet valve from a bi-metal slug composed of a main body formed from stress-resisting tough steel and an end cover composed of corrosion resisting steel integrally bonded to the main body which comprises simultaneously extruding and drawing the slug progressively from the covered end thereof to reduce the diameter of the slug and to draw the cover around the sides of the resulting reduced diameter blank, extruding the blank progressively from the tough steel end of the blank to form an elongated reduced diameter valve stem, terminating the last mentioned extrusion as the leading sides of the cover are drawing inwardly to partially underlap the non-extruded portion of the blank for forming a sheathed head on the stem, and flattening the sheathed head to form a poppet valve head on the stem.

JOHN WISCHHUSEN.
GEORGE D. DOLCH, Jr.